United States Patent [19]
Valkó et al.

[11] Patent Number: 5,936,964
[45] Date of Patent: Aug. 10, 1999

[54] ROUND-TRIP DELAY OPTIMIZATION OF MULTIPLEXED SPEECH CHANNELS

[75] Inventors: András Valkó, Budapest, Hungary; Lars Westberg, Enköping, Sweden

[73] Assignee: Telefonaktiebolaget LM Ericsson, Stockholm, Sweden

[21] Appl. No.: 08/844,519

[22] Filed: Apr. 18, 1997

[51] Int. Cl.$^6$ .................. H04J 3/16; H04J 3/22
[52] U.S. Cl. .......... 370/468; 370/429; 370/519; 370/537
[58] Field of Search .................. 370/229, 230, 370/231, 235, 238, 447, 411, 412, 468, 508, 516, 517, 519, 280, 252, 276, 428, 429, 253, 532, 249, 437, 537, 442; 375/371, 220, 356

[56] References Cited

U.S. PATENT DOCUMENTS

| | | | |
|---|---|---|---|
| 5,361,255 | 11/1994 | Diaz et al. | 370/411 |
| 5,375,118 | 12/1994 | Rao et al. | 370/411 |
| 5,745,529 | 4/1998 | Heiss | 370/468 |

OTHER PUBLICATIONS

Wen–Tsuen Chen, et al., "A Feasible Framework of Traffic Control on an ATM Wide–Area Network", Computer Networks and ISDN Systems, vol. 27, No. 1, Oct. 1994, pp. 67–83.

Deh–phone K. Hsing, "Simulation and Performance Evaluation of an ATM Multiplexer Using Priority Scheduling", vol. 3 of 3, Dec. 1990, Institute of Electrical and Electronics Engineers, pp. 1946–1952.

Hiroshi Ishida, et al., "A Multiplexing Method in Consideration of Cell Delay Variation", vol. 3, May 1994, Institute of Electrical and Electronics Engineers, pp. 1501–1505.

Primary Examiner—Alpus H. Hsu
Assistant Examiner—Steven Nguyen
Attorney, Agent, or Firm—Burns, Doane, Swecker & Mathis, L.L.P.

[57] ABSTRACT

Data packets are transmitted in forward and backward directions via a multiplexed communications medium, wherein each of the data packets is associated with a corresponding one of a plurality of connections. Transmission is performed by, for each connection, assigning a forward delay limit and a corresponding backward delay limit, wherein the sum of the forward and backward delay limits is equal to a round-trip delay bound for the connection. The assigned forward delay limits are used to determine the order in which the data packets supplied by the plurality of connections will be transmitted in the forward direction. Similarly, the assigned backward delay limits are used to determine the order in which the data packets supplied by the plurality of connections will be transmitted in the backward direction. One embodiment accomplishes the forward and backward delay limit assignments by maintaining forward and backward lists of connection identifiers sorted in, for example, ascending order based on time of connection establishment in the forward direction, and in descending order based on time of connection establishment in the backward direction. In another embodiment, transmission order is determined by sorting arriving data packets at the time of their corresponding connection identifiers, wherein the forward and backward sorting rules are selected so that a sum of a forward transmission delay limit and a backward transmission delay limit is less than or equal to a round-trip delay bound for each connection.

26 Claims, 5 Drawing Sheets

ROUND-TRIP DELAY OPTIMIZATION OF MULTIPLEXED SPEECH CHANNELS

BACKGROUND

The present invention relates to the transmission of data on multiplexed channels, and more particularly to techniques for optimizing the round-trip delay experienced by data that is transmitted on multiplexed channels.

Sampled speech sources generate data traffic that typically consists of periodic packets of either constant or variable size. (The latter case comes from compression or silence removal). If a large number of speech connections are multiplexed on the same transport link, the transmission delay will include the delay caused by buffering those speech packets that arrive while the transport link is already busy transporting another packet. In the worst case, many or all packets arrive within a short time interval, consequently requiring that they be queued up for transmission. For a large number of connections this queuing delay might become the major component of end-to-end delay.

Because the speech connections send samples with a fixed inter-arrival time that is common to all of them (herein referred to as the "speech packet repetition rate"), the timing relations of packet arrivals from different connections are unchanged as long as the connections exist. This means that if a large number of connections (eventually all of them) send their packets at the same time, they will continue to do so until the connections are released. If First-In-First-Out (FIFO) buffering is used, an analysis of an idealized system would conclude that one of the connections would always have its packets arriving first, another one of the connections would always have its packets arriving second and so forth, resulting in a predictable order of buffering for each of the connections in this group. However, in practice there is some variability in each connection's exact arrival time (herein referred to as "jitter"). As a result, the order of transmission and therefore the buffering delay of packets sent in this group will depend on the jitter and will be unpredictable. Because of this unpredictability, conventional system designs need to ensure that each connection can handle the worst case delay, namely, the case when the connection's packet is the last one in the group to be transmitted.

Figure 1:
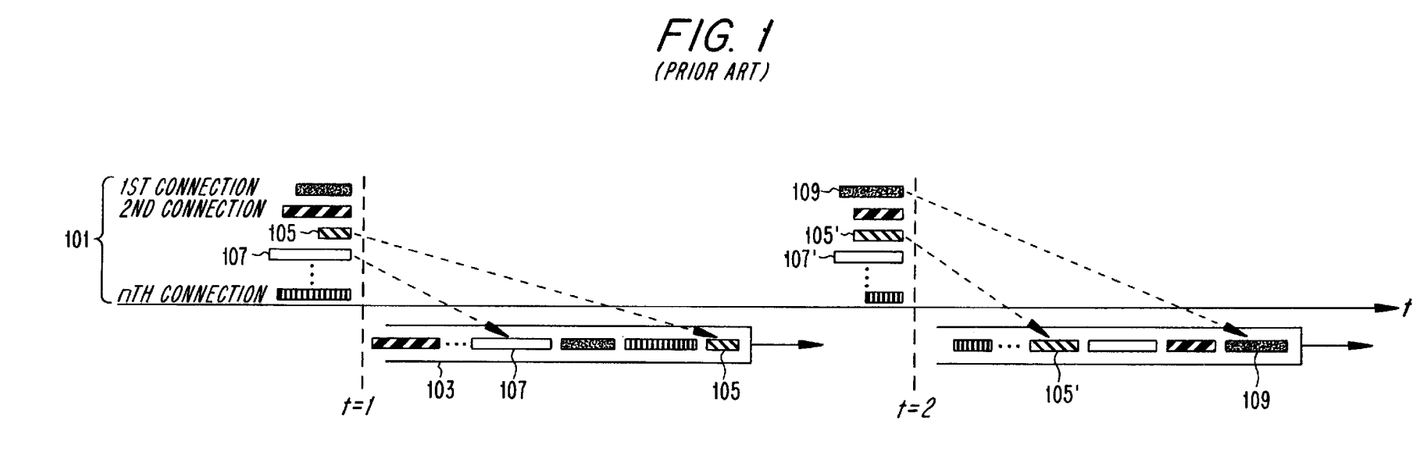
FIG. 1 is a diagram that illustrates the unpredictability of multiplexing delay associated with data transmission in conventional systems.

This situation is illustrated in FIG. 1. The packets for a group of connections 101 arrive approximately at the same time with regularity, so that at time t=1, they are transmitted as a group 103 in a first order. For example, the data packet 105, supplied by the third connection, happens to have been transmitted first, and the data packet 107, supplied by the fourth connection, happens to have been transmitted fourth.

At time t=2, however, the jitter in the packet arrival times causes a different transmission order to be used. In this example, the packet 105' from the third connection is no longer first, but is instead transmitted fourth. The first packet to be transmitted (i.e., packet 109) comes instead from the first connection. A similar reshuffling of transmission order affects other connections as well.

Thus, it can be seen that when a large number of connections send their packets at the same time, the multiplexing order will cause some packets to suffer very little multiplexing delay, while others will have to wait for a long time. However, the variability in transmission order means that at any given time, any of the connections could end up having its packet transmitted last, resulting in the longest possible uni-directional multiplexing delay (referred to herein as the "delay limit"). If all connections have the same multiplexing delay limit then the dimensioning of the system must ensure that even the last packet will be transmitted in time, in other words, the performance is dimensioned for the "worst case" possibility. Those packets that are not sent last will have a multiplexing delay that is less than the delay limit, but this difference is unused, and is therefore a loss.

For voice connections, the round-trip delay is more important than the uni-directional transmission delay because significant round-trip delay noticeably affects two people's ability to speak with one another via the communications channel. Because conventional systems base their design on the assumption that each connection will experience the worst case delay, it follows that the maximal round-trip delay will contain the maximal multiplexing delay twice (i.e., once in the forward direction, and once in the return, or "backward", direction). Thus, convention systems need to be designed to accommodate a round-trip delay equal to twice the delay limit.

There is therefore a need for techniques that optimize the round-trip delay experienced by speech packets that are transmitted via a shared medium

SUMMARY

In accordance with one aspect of the present invention, data packets are transmitted in forward and backward directions via a multiplexed communications medium, wherein each of the data packets is associated with a corresponding one of a plurality of connections. Transmission is performed by, for each connection, assigning a forward delay limit and a corresponding backward delay limit, wherein the sum of the forward and backward delay limits is equal to a round-trip delay bound for the connection. The assigned forward delay limits are used to determine the order in which the data packets supplied by the plurality of connections will be transmitted in the forward direction. Similarly, the assigned backward delay limits are used to determine the order in which the data packets supplied by the plurality of connections will be transmitted in the backward direction.

In another aspect of the invention, the forward and backward delay limit assignments are performed by maintaining forward and backward lists of connection identifiers. The forward list is sorted in a first sort order at the time of connection establishment in the forward direction, and the backward list is sorted in a second sort order at the time of connection establishment in the backward direction. The first and second sort orders are related so that a given connection identifier's distance from the head of the forward list is less than or equal to that connection identifier's distance from the end of the backward list.

In still another aspect of the invention, transmission order of arriving packets is determined by sorting arriving data packets (or identifiers representing the arriving data packets) based on their corresponding connection identifiers. The sort orders in the forward and backward directions are related so that a given connection identifier's distance from the head of the forward list is less than or equal to that connection identifier's distance from the end of the backward list.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

In accordance with one aspect of the invention, the performance of multiplexed channels is significantly improved by assigning, for each connection, its own round-trip delay bound. This is accomplished by adopting a strategy in which each connection is assigned a forward delay limit and a corresponding backward delay limit such that the sum of the forward and backward delay limits is less than or equal to the round-trip delay bound. The assigned forward and backward delay limits determine the order in which the corresponding connection's speech packets will be transmitted relative to the transmission of packets from other connections in the group.

In accordance with one embodiment of the invention, each connection is assigned the same round-trip delay bound by assigning, for each connection, forward and backward delay limits that permit a connection suffering a large forward multiplexing delay to have a low backward multiplexing delay, and vice versa. More particularly, each connection is assigned a forward delay limit, $d_{forward}$, in the range $$d_{min} \leq d_{forward} \leq d_{max}$$

where $d_{min}$ is a predefined minimum multiplexing delay, and $d_{max}$ is a predefined maximum multiplexing delay. Then, each connection is further assigned a corresponding backward delay limit, $d_{backward}$ that satisfies:

$$d_{backward} \leq d_{max} - d_{forward}$$

When transmitting a speech packet in the forward direction, its order of transmission is arranged so that its actual forward multiplexing delay is no greater than the forward delay limit, $d_{forward}$. Similarly, when transmitting a speech packet in the backward direction, its order of transmission is arranged so that its actual backward multiplexing delay is no greater than the backward delay limit, $d_{backward}$. This technique results in a decrease of the round-trip delay equal to the single direction delay's variable part.

Figure 2A:
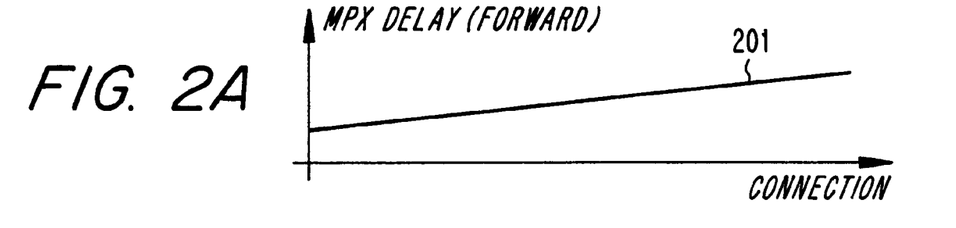
FIGS. 2A, 2B and 2C illustrate the resultant forward, backward and round-trip delays in accordance with one aspect of the invention.
Figure 2B:
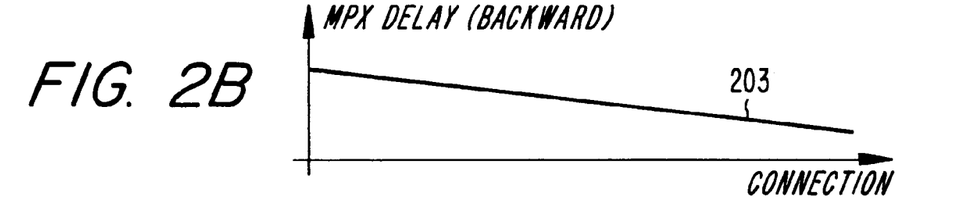
Figure 2C:
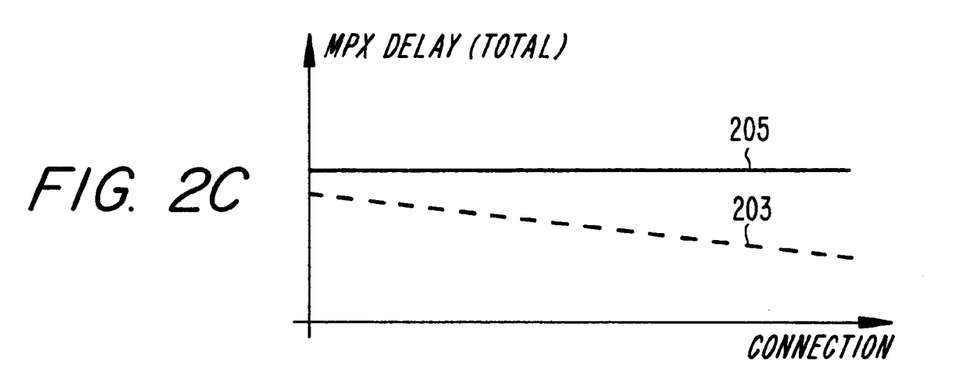

The results of this strategy are depicted in FIGS. 2A, 2B and 2C. Referring first to FIG. 2A, it can be seen that the connections are each assigned a forward multiplexing delay 201, ranging from low to high. Referring now to FIG. 2B, each connection is also assigned a backward multiplexing delay 203, ranging from high to low. The result, shown in FIG. 2C, is that the round-trip multiplexing delay 205 (equal to the forward multiplexing delay plus the backward multiplexing delay) is the same for each connection.

Figure 3A:
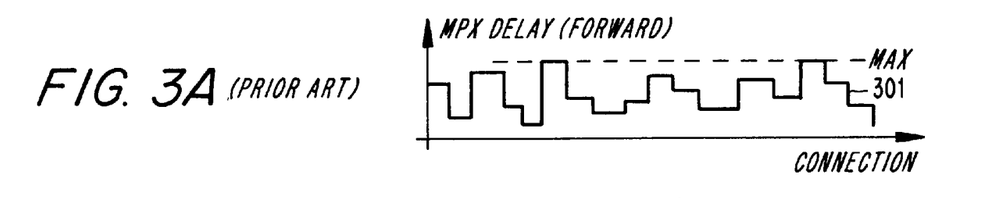
FIGS. 3A, 3B and 3C illustrate the forward, backward and round-trip delays in accordance with a conventional system.

These results may be compared with the outcome that is achieved in conventional approaches (see FIGS. 3A, 3B and 3C), in which forward multiplexing delays are not correlated with backward multiplexing delays. In FIG. 3A, the forward multiplexing delays 301 of the connections are shown. The reason for the apparent randomness of distribution of forward multiplexing delays 301 is because these delays are not assigned on any basis.

Figure 3B:
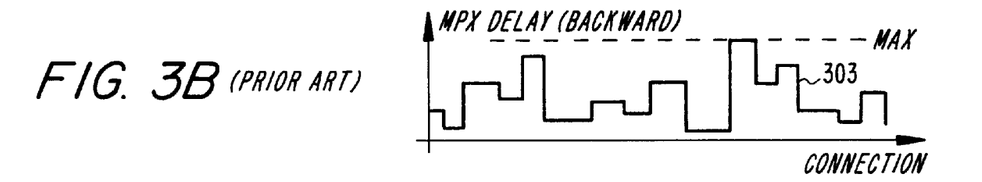
Figure 3C:
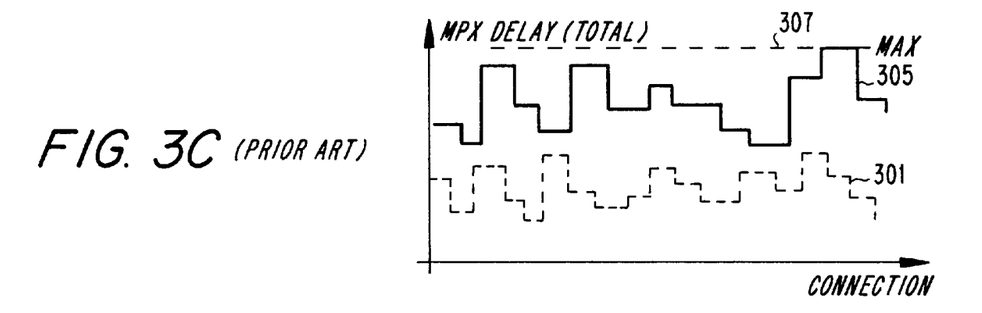

In FIG. 3B, the backward multiplexing delays 303 of the connections are shown. In conventional systems, the distribution of these delays is also apparently random, but moreover, for any one connection there is no correlation between the backward multiplexing delay 303 and the forward multiplexing delay 301. As a consequence, in conventional systems the round-trip multiplexing delays 305 are not only not uniform, but more importantly, they vary from transmission to transmission (not shown) because there is no guarantee that either the forward or the backward multiplexing delay will be the same from one transmission to the next. It should further be noted that, in FIG. 3C the maximum possible round-trip delay (not shown) may exceed the actual maximum round-trip delay 307, because the maximum possible round-trip delay would only occur if the same connection experienced the longest multiplexer delay in both the forward and backward directions.

The inventive round-trip delay optimization techniques described here require that the forward and backward multiplexers have the ability to identify and sort packets belonging to different connections. Two embodiments will now be described in which different techniques for performing this sorting are used. In one embodiment, a list is maintained regarding the currently established connections. In a second embodiment, a real-time sorting is used. For the purpose of facilitating an understanding of the invention, both descriptions will assume that all connections send their packets at the same time. However, the invention is not limited by this assumption. Rather, the techniques can also be used for "groups" of connections, that is, for a set of connections that send packets at the same time. In this case, the multiplexers must differentiate between groups.

List-based Embodiment

Figure 4:
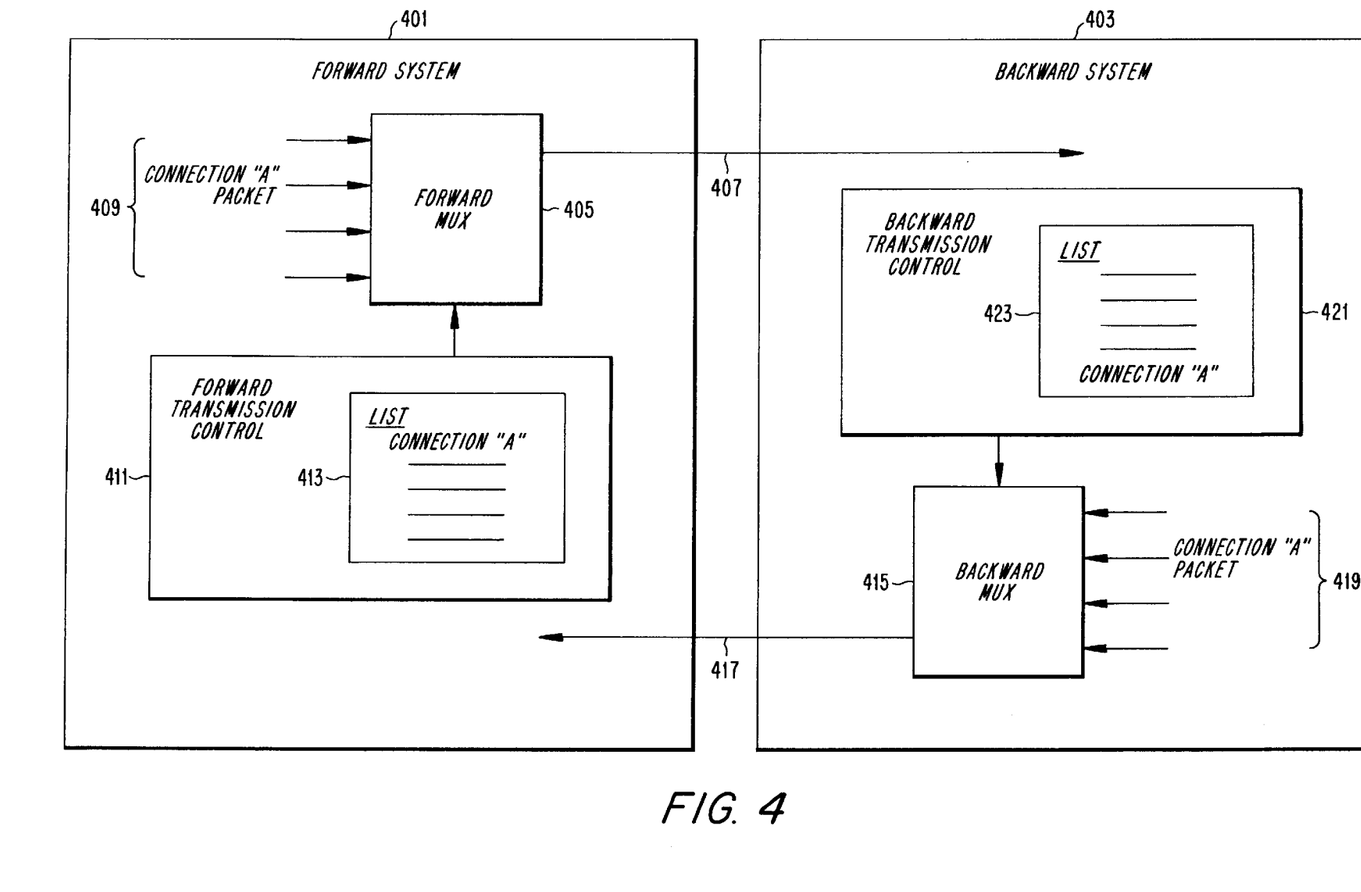
FIG. 4 is a block diagram of a list-based transmission system in accordance with one embodiment of the invention.

A list-based embodiment will now be described with reference to FIG. 4. A forward system 401 that exchanges speech packets with a backward system 403 is shown. The forward system 401 has a forward multiplexer 405 for supplying a speech packet to a forward transmission medium 407, where the speech packet is selected from a number of speech packets 409 supplied by a number of connections. The forward multiplexer's selection of a speech packet is controlled by a forward transmission control unit 411.

The backward system 403 similarly has a backward multiplexer 415 for supplying a speech packet to a backward transmission medium 417, where the speech packet is selected from a number of speech packets 419 supplied by a number of connections. The backward multiplexer's selection of a speech packet is controlled by a backward transmission control unit 421.

In accordance with this embodiment of the invention, the forward transmission control unit 411 includes a forward multiplexing list 413, and the backward transmission control unit 421 includes a backward multiplexing list 423, each list having entries identifying the voice connections currently set up.

Whenever a new connection is established, its connection identifier must be inserted into each of the forward and backward multiplexing lists 413, 423. In particular, the forward system 401 inserts the new connection identifier (e.g., connection "A" shown in FIG. 4) at the beginning of the forward multiplexing list 413, while the backward system 403 inserts the same connection identifier at the end of the backward multiplexing list 423. (The notations of "forward" and "backward" are of course only to differentiate between the two directions. The roles are interchangeable.) Of course, insertion of a new connection identifier at the beginning and end of the respective forward and backward multiplexing lists 413, 423 is merely one embodiment. In general, one could practice the invention by inserting the new connection identifier into an arbitrary location in the forward multiplexing list 413, so long as the position of that same new connection identifier in the backward multiplexing list 423 is determined by ensuring that the distance between the new connection identifier in the forward multiplexing list 413 and the head of the forward multiplexing list 413 is less than or equal to the distance between the position of the new connection identifier in the backward multiplexing list 423 and the back of the backward multiplexing list 423. (Again, the designation of "forward" and "backward" directions is arbitrary.)

If a connection is released, its identifier is deleted from each of the forward and backward multiplexing lists 413, 423.

When packets arrive at each of the forward and backward systems 401, 403, their connection identifiers are read and the packets are transmitted according to the order of their identifiers in the corresponding one of the forward and backward multiplexing lists 413, 423. In the example illustrated in FIG. 4, a packet for Connection "A" would be transmitted first from the forward system 401, and last from the backward system 403.

It is possible that jitter will cause the packets to not arrive exactly at the same time. This creates the possibility that a packet that should be transmitted now is not yet available while other packets (from other connections) are already in the buffer (not shown). This situation is called "Head Of Line blocking". In this case, each of the forward and backward systems 401, 403 may adopt one of the following alternative strategies:

1) Wait until the missing packet arrives. This may result in a delaying of all packets with a maximum of the maximal jitter time, which is still considerably less than the delay saving.
2) Advance the list pointer to skip over the non-available packet, but after transmitting the next packet, the list pointer must be set back to this skipped packet again. Because the jitter will usually be less than the transmission time of one packet, the skipped packet will most likely now be available. After transmitting the skipped packet, advance the pointer to the next not-yet-transmitted packet. In an alternative embodiment, the same strategy may be utilized without the need for list pointers by providing means for identifying, at each packet transmitting interval, a highest priority available packet, where the priority is determined in accordance with the predefined sort ordering schemes.

The above-described list-based embodiment is advantageously applied in systems where processing power is a limited resource. Its disadvantage is that each of the forward and backward transmission control units 411, 421 must be supplied with information regarding existing connections.

Sorting-based Embodiment

Figure 5:
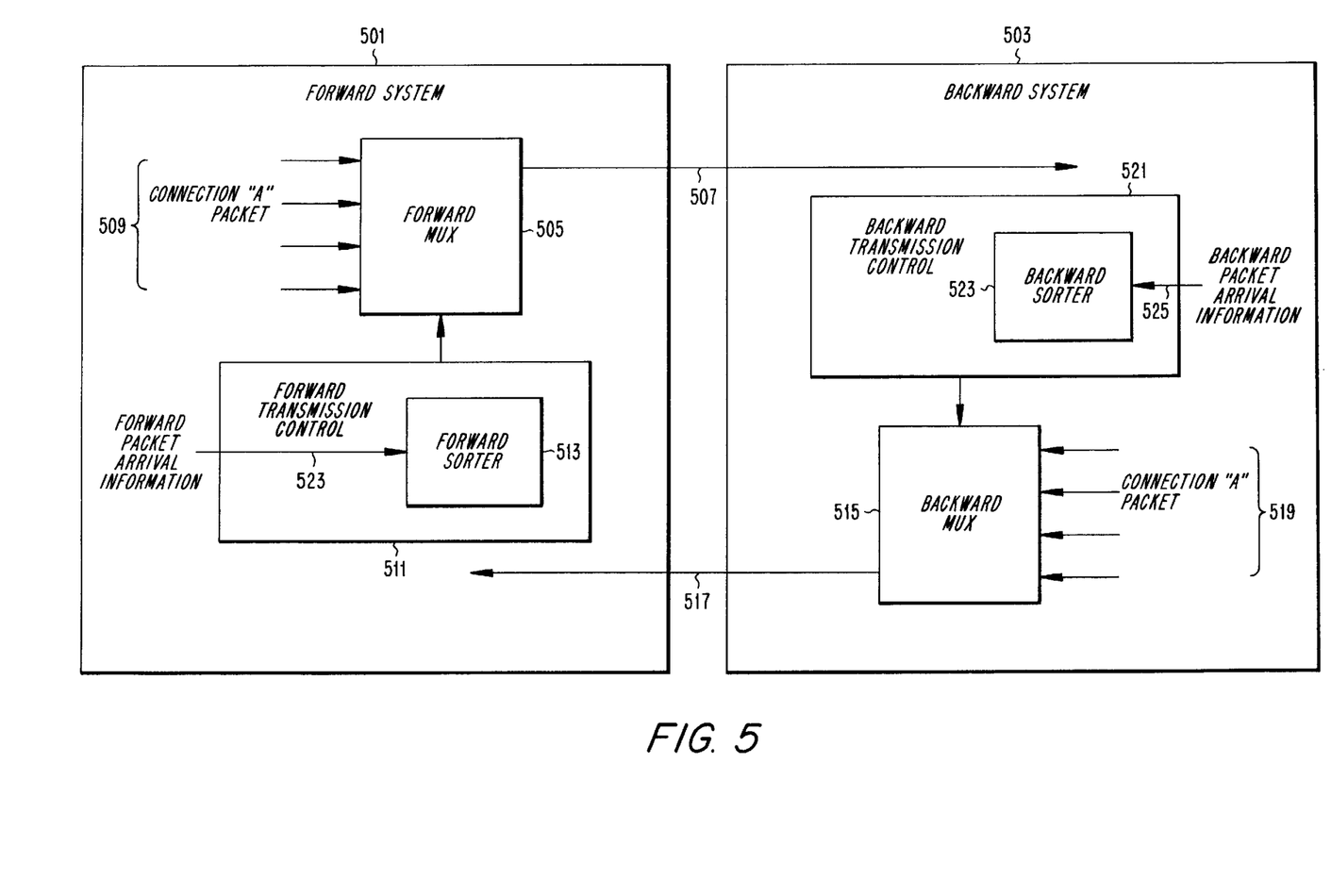
FIG. 5 is a block diagram of a sorting-based transmission system in accordance with another embodiment of the invention.

A sorting-based embodiment will now be described with reference to FIG. 5. A forward system 501 that exchanges speech packets with a backward system 503 is shown. The forward system 501 has a forward multiplexer 505 for supplying a speech packet to a forward transmission medium 507, where the speech packet is selected from a number of speech packets 509 supplied by a number of connections. The forward multiplexer's selection of a speech packet is controlled by a forward transmission control unit 511.

The backward system 503 similarly has a backward multiplexer 515 for supplying a speech packet to a backward transmission medium 517, where the speech packet is selected from a number of speech packets 519 supplied by a number of connections. The backward multiplexer's selection of a speech packet is controlled by a backward transmission control unit 521.

In this embodiment, the forward transmission control unit 511 includes a forward sorter 513, and the backward transmission control unit includes a backward sorter 523. The forward sorter 513 is supplied with forward packet arrival information 523, and the backward sorter 523 is supplied with backward arrival information 525.

This hardware is operated as follows:

For each of the forward and backward systems 501, 503, arriving packets are sorted according to their connection identifiers, which do not have to be known to the forward and backward transmission control units 511, 521 in advance. The connection identifier information is included in each of the forward and backward packet arrival information 523, 525. The forward sorter 513 sorts the connection identifier information in increasing (i.e., ascending) identifier order, and the backward sorter 523 sorts the connection identifier information in the decreasing (i.e., descending) identifier order. Alternatively, instead of using increasing and decreasing sorting orders, the packets can be ordered in an arbitrary way, so long as the ordering generated by the forward and backward sorters 513, 523 satisfies the condition that the resultant delay when transmitting any given connection's packets in the forward direction is less than or equal to the difference between the maximum possible delay and the delay associated with transmitting that given connection's packets in the backward direction (with the designations of "forward" and "backward" being arbitrarily predetermined).

Each of the forward and backward transmission control units 511, 521 controls their respective forward and backward multiplexers 505, 515 so that the packets will be transmitted in the order determined by the respective forward and backward sorters 513, 523. It is again noted that the designation of one direction being "forward" and the other "backward" is completely arbitrary, and that the roles are interchangeable.

In each of the forward and backward systems 501, 503, arriving packets are inserted into a buffer (not shown). If the buffer is not empty, the newly arriving packet is inserted into the buffer according to its connection identifier, in other words, as if the buffer was resorted. As used here, the term "buffer" may refer to a buffer for storing the packets themselves, or may alternatively refer to a buffer for storing a sorted list of connection identification information that is used by the respective ones of the forward and backward transmission control units 511, 521

After a packet has been transmitted, it is removed from the head of the buffer, and the packet that is at the new head of the buffer is taken next.

The above-described sorting-based embodiment is advantageously applied in systems where it is problematic for the forward and backward transmission control units 511, 521 to be supplied with information regarding existing connections. The disadvantage of this technique is that it requires a greater amount of processing power in each of the forward and backward systems, in order to be able to perform the sorting and other operations.

By reducing the sum of forward and backward round-trip delays, the inventive techniques described here are able to increase the efficiency of multiplexing voice connections over a link, compared to conventional techniques.

The invention has been described with reference to a particular embodiment. However, it will be readily apparent to those skilled in the art that it is possible to embody the invention in specific forms other than those of the preferred embodiment described above. This may be done without departing from the spirit of the invention. For example, the invention has been described in connection with speech packets. However, the techniques described here are applicable to the transmission of any data packets, regardless of what their content represents. Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of transmitting data packets in forward and backward directions via a multiplexed communications medium, wherein each of the data packets is associated with a corresponding one of a plurality of connections, the method comprising the steps of:

for each connection, assigning a forward delay limit and a corresponding backward delay limit, wherein the sum of the forward and backward delay limits is less than or equal to a round-trip delay bound for the connection;

using the assigned forward delay limits to determine the order in which the data packets supplied by the plurality of connections will be transmitted in the forward direction; and using the assigned backward delay limits to determine the order in which the data packets supplied by the plurality of connections will be transmitted in the backward direction.

2. The method of claim 1, wherein:

for each of the connections, the forward delay limit, $d_{forward}$, is in a range $$d_{min} \leq d_{forward} \leq d_{max}$$

where $d_{min}$ is a predefined minimum multiplexing delay, and $d_{max}$ is a predefined maximum multiplexing delay; and for each of the connections, the corresponding backward delay limit, $d_{backward}$, is assigned a value in accordance with $$d_{backward} \leq d_{max} - d_{forward}.$$

3. The method of claim 1, wherein the round-trip delay bound is the same for each of the connections.

4. A method of transmitting data packets in forward and backward directions via a multiplexed communications medium, wherein each of the data packets is associated with a corresponding one of a plurality of connections, the method comprising the steps of:

providing a forward multiplexing list;

providing a backward multiplexing list;

when a connection is established, inserting a corresponding connection identifier at a first position in the forward multiplexing list, and inserting the corresponding connection identifier at a second position in the backward multiplexing list, wherein the distance of the first position from the head of the forward multiplexing list is less than or equal to the distance of the second position from the back of the backward multiplexing list;

in the forward direction, transmitting arriving data packets supplied from the plurality of connections in an order determined by the forward multiplexing list; and in the backward direction, transmitting arriving data packets supplied from the plurality of connections in an order determined by the backward multiplexing list.

5. The method of claim 4, wherein:

the first position is the head of the forward multiplexing list; and the second position is the end of the backward multiplexing list.

6. The method of claim 4, further comprising the step of:

if a first data packet that should be transmitted now is not yet available while data packets from other connections are available, then waiting until the first data packet becomes available.

7. The method of claim 4, further comprising the step of:

for the forward direction, if a first data packet that should be transmitted now is not yet available while data packets from other connections are available, then skipping over the first data packet and transmitting a next data packet as determined by the forward multiplexing list.

8. The method of claim 7, wherein the step of skipping over the first data packet and transmitting the next data packet as determined by the forward multiplexing list further comprises the step of:

after transmitting the next data packet as determined by the forward multiplexing list, transmitting the first data packet.

9. The method of claim 8, further comprising the step of:

after transmitting the first data packet, transmitting a next not-yet-transmitted data packet as determined by the forward multiplexing list.

10. A method of transmitting data packets in forward and backward directions via a multiplexed communications medium, wherein each of the data packets is associated with a corresponding one of a plurality of connections, the method comprising the steps of:

in the forward direction, sorting arriving data packets in accordance with a first sorting rule based on connection identifiers of the corresponding connections, and transmitting the arriving data packets in the forward direction in an order based on the forward direction sorting step; and in the backward direction, sorting arriving data packets in accordance with a second sorting rule based on connection identifiers of the corresponding connections, and transmitting the arriving data packets in the backward direction in an order based on the backward sorting step, wherein the first and second sorting rules are selected so that a sum of a forward transmission delay limit and a backward transmission delay limit is less than or equal to a round-trip delay bound for each connection.

11. The method of claim 10 wherein:

the first sorting rule is sorting in ascending order; and the second sorting rule is sorting in descending order.

12. The method of claim 10, wherein the sorting and transmitting steps in the forward direction comprise the steps of:

inserting the arriving data packets into a buffer so that the buffer will contain all data packets that have arrived, wherein the buffer contents are sorted in ascending order; and transmitting the arriving data packets from a head of the buffer in ascending order.

13. The method of claim 10, wherein the sorting and transmitting steps in the forward direction comprise the steps of:

inserting connection identifiers associated with the arriving data packets into a buffer so that the buffer will contain all connection identifiers associated with data packets that have arrived, wherein the buffer contents are sorted in ascending order; and transmitting the data packets that have arrived in an order determined by the order of the connection identifiers in the buffer.

14. An apparatus for transmitting data packets in forward and backward directions via a multiplexed communications medium, wherein each of the data packets is associated with a corresponding one of a plurality of connections, the apparatus comprising:

means for assigning, for each connection, a forward delay limit and a corresponding backward delay limit, wherein the sum of the forward and backward delay limits is equal to a round-trip delay bound for the connection;

means for using the assigned forward delay limits to determine the order in which the data packets supplied by the plurality of connections will be transmitted in the forward direction; and means for using the assigned backward delay limits to determine the order in which the data packets supplied by the plurality of connections will be transmitted in the backward direction.

15. The apparatus of claim 14, wherein:

for each of the connections, the forward delay limit, $d_{forward}$, is in a range $$d_{min} \leq d_{forward} \leq d_{max}$$

where $d_{min}$ is a predefined minimum multiplexing delay, and $d_{max}$ is a predefined maximum multiplexing delay; and for each of the connections, the corresponding backward delay limit, $d_{backward}$, is assigned a value in accordance with $$d_{backward} \leq d_{max} - d_{forward}.$$

16. The apparatus of claim 14, wherein the round-trip delay bound is the same for each of the connections.

17. An apparatus for transmitting data packets in forward and backward directions via a multiplexed communications medium, wherein each of the data packets is associated with a corresponding one of a plurality of connections, the apparatus comprising:

a forward multiplexing list;

a backward multiplexing list;

means, responsive to a connection being established, for inserting a corresponding connection identifier at a first position in the forward multiplexing list, and for inserting the corresponding connection identifier at a second position in the backward multiplexing list, wherein the distance of the first position from the head of the forward multiplexing list is less than or equal to the distance of the second position from the back of the backward multiplexing list;

in the forward direction, means for transmitting arriving data packets supplied from the plurality of connections in an order determined by the forward multiplexing list; and in the backward direction, means for transmitting arriving data packets supplied from the plurality of connections in an order determined by the backward multiplexing list.

18. The apparatus of claim 17, wherein:

the first position is the head of the forward multiplexing list; and the second position is the end of the backward multiplexing list.

19. The apparatus of claim 17, further comprising:

means, responsive to non-availability of a first data packet that should be transmitted now while data packets from other connections are available, for waiting until the first data packet becomes available.

20. The apparatus of claim 17, further comprising:

for the forward direction, means, responsive to non-availability of a first data packet that should be transmitted now, for skipping over the first data packet and transmitting a next available data packet as determined by the forward multiplexing list.

21. The apparatus of claim 20, wherein the means for skipping over the first data packet and transmitting the next available data packet as determined by the forward multiplexing list further comprises:

means for transmitting the first data packet after transmitting the next data packet as determined by the forward multiplexing list.

22. The apparatus of claim 21, further comprising:

means for transmitting a next not-yet-transmitted data packet as determined by the forward multiplexing list after transmitting the first data packet.

23. An apparatus for transmitting data packets in forward and backward directions via a multiplexed communications medium, wherein each of the data packets is associated with a corresponding one of a plurality of connections, the apparatus comprising:

in the forward direction, means for sorting arriving data packets in accordance with a first sorting rule based on connection identifiers of the corresponding connections, and for transmitting the arriving data packets in the forward direction in an order based on the forward direction sorting operation; and in the backward direction, means for sorting arriving data packets in accordance with a second sorting rule based on connection identifiers of the corresponding connections, and for transmitting the arriving data packets in the backward direction in an order based on the backward sorting operation, wherein the first and second sorting rules are selected so that a sum of a forward transmission delay limit and a backward transmission delay limit is less than or equal to a round-trip delay bound for each connection.

24. The apparatus of claim 23 wherein:

the first sorting rule is sorting in ascending order; and the second sorting rule is sorting in descending order.

25. The apparatus of claim 23, wherein the sorting and transmitting means in the forward direction comprises:

means for inserting the arriving data packets into a buffer so that the buffer will contain all data packets that have arrived, wherein the buffer contents are sorted in ascending order; and means for transmitting the arriving data packets from a head of the buffer in ascending order.

26. The apparatus of claim 23, wherein the means for sorting and transmitting in the forward direction comprises:

means for inserting connection identifiers associated with the arriving data packets into a buffer so that the buffer will contain all connection identifiers associated with data packets that have arrived, wherein the buffer contents are sorted in ascending order; and means for transmitting the data packets that have arrived in an order determined by the order of the connection identifiers in the buffer.

* * * * *